United States Patent [19]

Jeffrey et al.

[11] Patent Number: 5,528,406
[45] Date of Patent: Jun. 18, 1996

[54] TELECOMMUNICATIONS SWITCHING DEVICE

[75] Inventors: Mark T. Jeffrey; Richard J. Proctor, both of Dorset; Peter J. Duthie, Northampton, all of United Kingdom

[73] Assignee: GPT Limited, United Kingdom

[21] Appl. No.: 518,658

[22] Filed: Aug. 24, 1995

Related U.S. Application Data

[63] Continuation of Ser. No. 30,341, May 20, 1993, abandoned.

[30] Foreign Application Priority Data

Aug. 2, 1991 [GB] United Kingdom .................. 9116750

[51] Int. Cl.⁶ .................................................. H04J 14/02
[52] U.S. Cl. ......................... 359/128; 359/139; 359/123
[58] Field of Search ........................... 359/117, 125, 359/128, 137, 123, 139, 135, 158

[56] References Cited

U.S. PATENT DOCUMENTS

| | | | |
|---|---|---|---|
| 4,797,879 | 1/1989 | Habbab et al. ........................ | 359/123 |
| 4,894,818 | 1/1990 | Fujioka et al. ......................... | 359/117 |
| 4,939,721 | 7/1990 | De Bosio ............................... | 359/117 |
| 5,005,166 | 4/1991 | Suzuki et al. .......................... | 359/123 |
| 5,036,512 | 7/1991 | Cloonan et al. ....................... | 359/124 |
| 5,040,169 | 8/1991 | Guerin et al. ........................... | 359/124 |
| 5,091,905 | 2/1992 | Amada ................................... | 359/135 |
| 5,105,292 | 4/1992 | Le Roy et al. ......................... | 359/123 |
| 5,121,381 | 6/1992 | Takahashi et al. ..................... | 359/124 |
| 5,194,977 | 3/1993 | Nishio .................................... | 359/123 |
| 5,208,691 | 5/1993 | Nishio .................................... | 359/123 |
| 5,303,077 | 4/1994 | Böttle et al. ........................... | 359/123 |

FOREIGN PATENT DOCUMENTS

| | | | |
|---|---|---|---|
| 0090146 | 7/1980 | Japan .................................... | 359/117 |
| 60-237793 | 11/1984 | Japan .............................. | H04Q 3/52 |
| 2074815 | 11/1981 | United Kingdom ........... | H04Q 11/04 |
| 2139443A | 5/1983 | United Kingdom .................. | 359/139 |
| 2212364 | 7/1989 | United Kingdom ........... | H04Q 11/04 |
| 2224417 | 5/1990 | United Kingdom ........... | H04Q 11/04 |
| 2244408 | 11/1991 | United Kingdom ........... | H04Q 11/04 |

Primary Examiner—Leslie Pascal
Assistant Examiner—Rafael Bacares
Attorney, Agent, or Firm—Kirschstein et al.

[57] ABSTRACT

A telecommunications switching device includes a plurality of ports and a plurality of switching units and a connecting circuit for connecting each of the ports to each of the switching units in turn. The connecting circuit includes a photonic channel separation circuit and a photonic space switching circuit.

4 Claims, 5 Drawing Sheets

TELECOMMUNICATIONS SWITCHING DEVICE

This is a continuation of application Ser. No. 08/030,341, filed on May 20, 1993 now abandoned.

BACKGROUND

An ATM switch such as is described, for example, in U.K. Patent Application No. GB 9103759.8 requires a unit to provide what is known as a DMR rotation function. The initials DMR stand for De-multiplex, Mix, Re-multiplex, which was the process by which the operation was carried out as described in Patent No. GB 2074815. This may comprise a 16×16 port device where each input port is switched to each output port in a constantly repeating cycle. Modules which carry out the same function are now known which do not follow the original DMR sequence but are still referred to by the same title, typically what is known as a "Rotator".

The term DMR as used herein refers to a device which provides the function and not the specific sequence of operations normally defined by a DMR.

Patent Application No. GB 9103759.8 and Patent No. GB 2074815 are imported herein by reference.

SUMMARY OF THE INVENTION

According to the present invention there is provided a telecommunications switching device wherein the switching device switches at least one control channel and a plurality of data channels comprising a plurality of ports and a plurality of switching units and connecting means for connecting each of the ports to each of the switching units in turn, wherein the connecting means includes photonic channel separation means and photonic space switching means.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
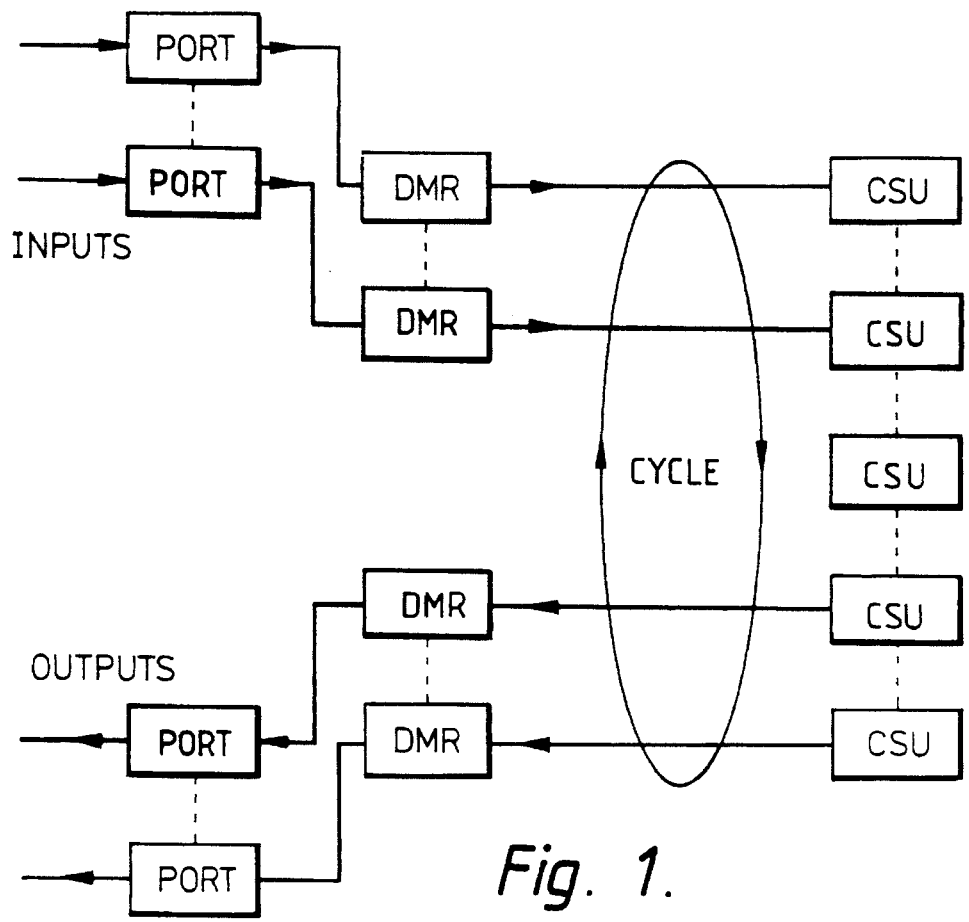
FIG. 1 is a block diagram of the switching concept.

The function of the DMRs as shown in FIG. 1 is to connect each input port to each of the Central Switch Units (CSU) in turn, and subsequently to connect each central unit to each output port in turn. This spreads the input load evenly over all the central switch units, and allows every input to send data to any output port within one rotation cycle.

Figure 2:
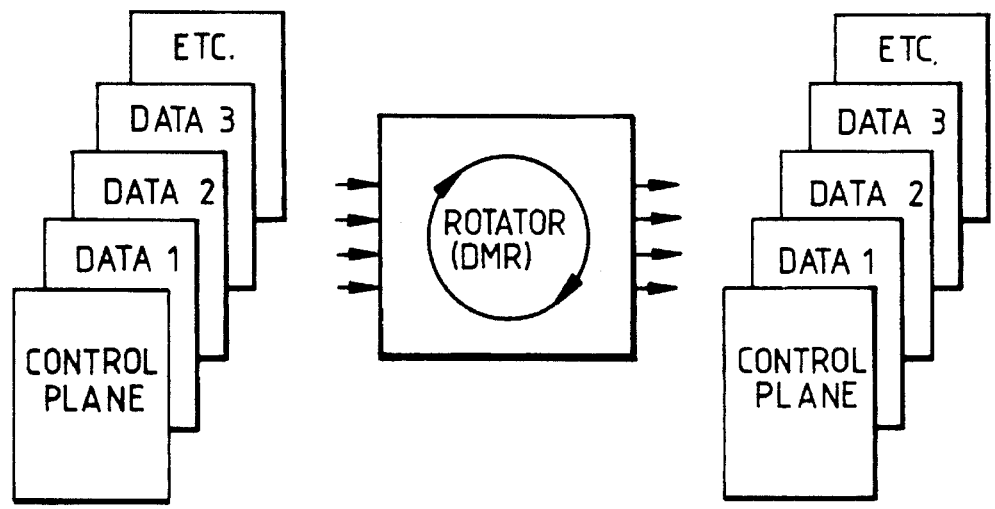
FIG. 2 shows a block diagram of a DMR application.
Figure 3:
FIG. 3 shows a block diagram of a typical spacial rotation function.
Figure 3:
Figure 3:
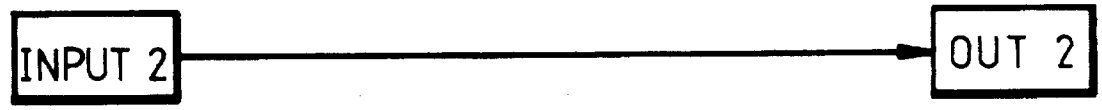
Figure 3:
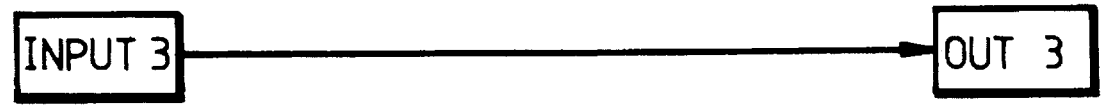
Figure 3:
Figure 3:
Figure 3:
Figure 3:

One current design of ATM switch, as shown in FIG. 2, requires this to be done for each of 7 data planes, plus a control plane. The control data has to be switched at least one port ahead of the data.

At present this is done by means of an electronic device for each plane, with the control plane being DMRed one or more timeslots ahead of the corresponding data plane DMRs. The precise separation of control and data planes is dependent on the configuration of the switch fabric itself, and must be left as flexible as possible.

It is proposed to replace the whole of this electronic function with a photonic solution, utilizing photonic channel separation and space switching techniques. The objective is, for example, a photonic device with 16 fiber inputs and 16 fiber outputs, but handling all 8 planes of the switch in a single component.

The "control plane" mentioned above does not provide any control of the DMR device under discussion. Control of the DMR itself is accomplished by means of an electronic signal to its own control logic.

Also 16×16 ports and 8 planes are not restrictive, and the concept could apply to any number of ports or planes. These are merely given as examples appropriate to the current switch architecture proposals.

While initially intended for use within an ATM switch of the type sometimes known as a "Turbine" switch, the invention may also have applications in other types of switch design.

A PHOTONIC DMR

Data Channel Multiplex

Ignoring the control channel initially, the 7 data channels may be multiplexed together.

Each of these is currently run at only about 40 Mbit/s, so it is perfectly possible to multiplex this up to 280 Mbit/s electronically, so as to have a single data flow.

Alternatively, this multiplexing can be achieved using Wavelength Division Multiplexing (WDM) technology. In this case, each channel will continue to operate at only 40 Mbit/s, thus reducing the cost of the components.

The WDM method consists of allocating each of the data planes to a specific wavelength of light, and then combining them in the same fiber. Provided that the other photonic components employed can handle this "bundle" of wavelengths as a whole, this allows all the data planes to be managed as one.

Data Channel Switching

Once gathered together, the data channels can be space switched by means of a Lithium Niobate (or similar) optical space switch, or by some comparable technology.

This component can be built as a 16×16 device, and because it is only required to operate as a commutator, it can be made re-arrangeably non-blocking (which is simpler than fully non-blocking).

Control of the elements of the optic switch can be handled by a small amount of on-chip logic, such that only the cyclic rotation signal need be provided to the device from outside. This signal would probably be electronic in nature and be derived from the system clocks.

Control Channel Separation

As noted above, the ATM switch design requires that the control channel to be switched in advance of the data channels share the same input fiber. There are at least two possibilities for this:

a) Offset switching. This method consists of de-multiplexing the control channel prior to entering the optic rotation space switch, such that the control channel is inserted into a different port of the switch. This could be achieved either by means of a hard wired fiber connection, or by means of a simple optic cross-connect switch, giving a programmable offset for the device.

b) Dual switching. An alternative is to use another complete rotation switch to handle the control channel, with the main switch being used for the data channel only. The two switches could then be synchronised from the same on-chip logic.

Figure 4:
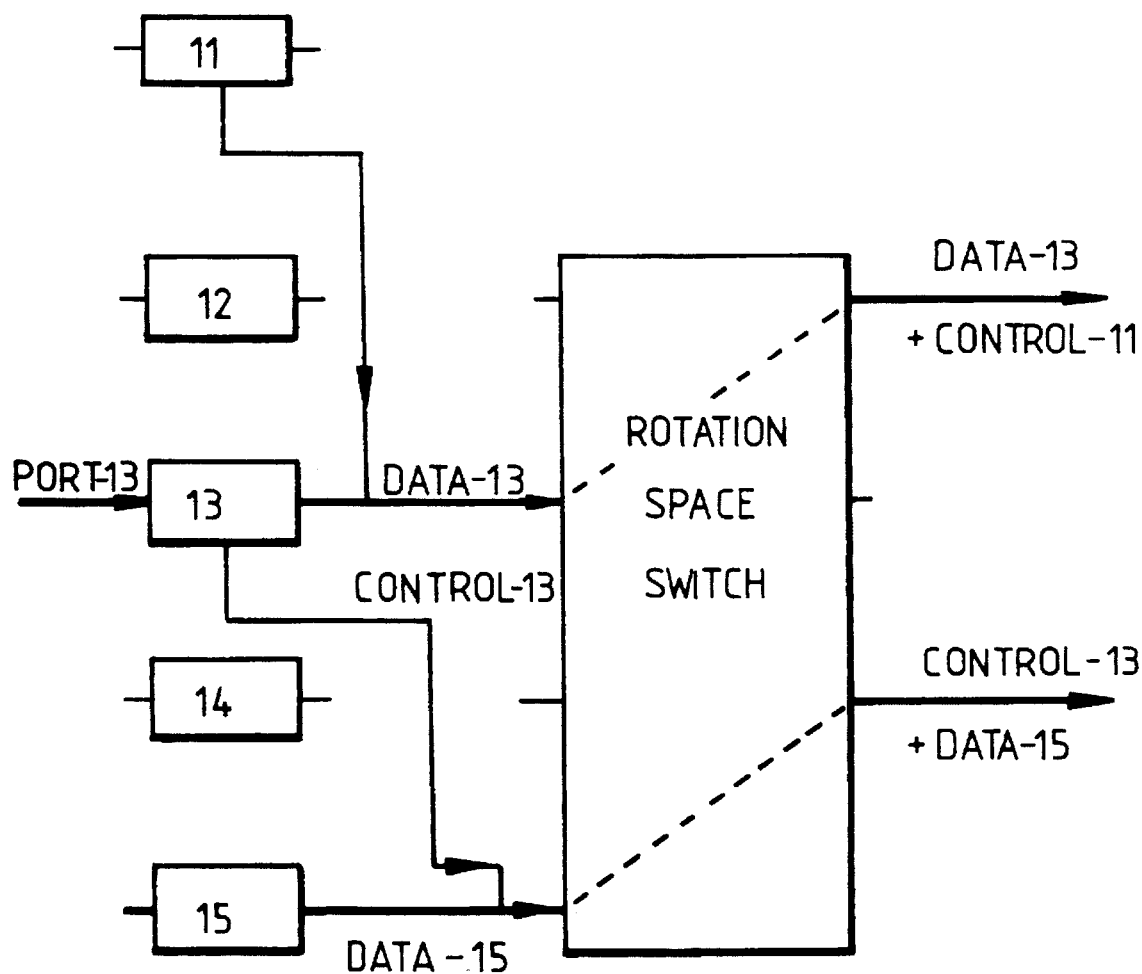
FIG. 4 shows a block diagram of an example of an offset switching method.
Figure 5:
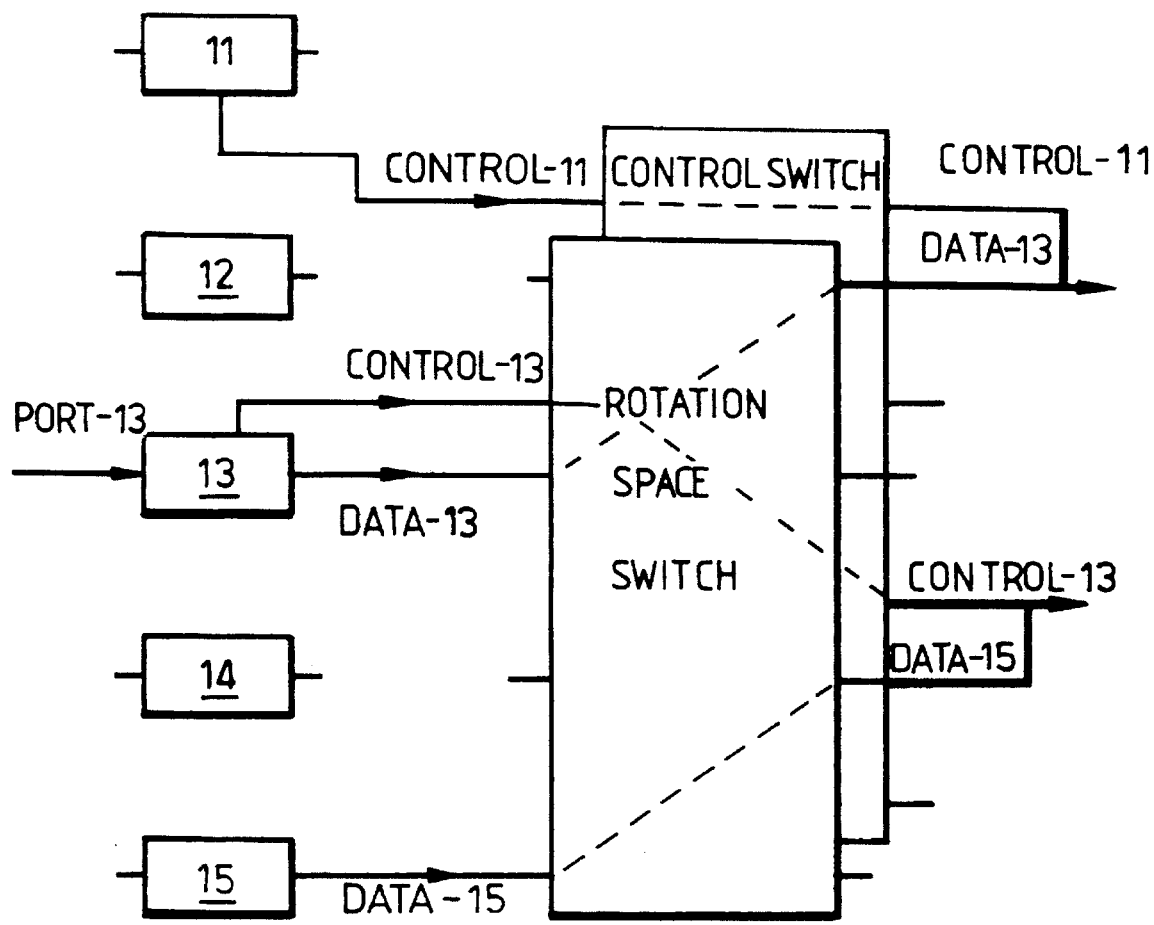
FIG. 5 shows a block diagram of an example of a dual switching method.

These two are shown in FIGS. 4 and 5 respectively.

In FIG. 4 if the timeslot relationship between the control plane and data planes were fixed, it would be possible to provide a physical waveguide or fiber between the separator and the associated switch port.

However, since this timeslot relationship may require to be changed from one installation to another, it may be better to provide another optic switch for this function. This would remain locked to a particular configuration while in use, but will make the device completely programmable, and thus more general purpose.

This problem does not arise with the Dual Switch method shown in FIG. 5, since the relationship between the cycles of the two rotators can easily be made programmable.

For either of the above methods, it is necessary to demultiplex the control channel from the data prior to any offset being done. There are at least two possibilities for solving this separation.

Control Channel Wavelength

The control data could be separated by the same WDM techniques that are used to separate the data channels. If the data channels are multiplexed electrically, WDM can still be used for control separation.

Control Channel Polarization

If the system employs polarization-maintaining fiber technology, then it will be possible to polarize the control channel opposite to the data channels. It is then possible to separate the control on this basis and use a front-end switch to move this data to another input port of the main space switch.

With this method it may still be worth putting the control channel on a separate WDM wavelength so as to permit merging with data channels again at a later point. Some optic components are polarization sensitive, so it may be desirable to change the control polarization back into line with the data channels at a later point.

Consideration should also be given to the section on bi-directionality below.

IMPLEMENTATION

One possible implementation of the present invention could be as of follows.

Incoming fibers

Each incoming fiber has data encoded on in the following manner:

| Contents | Wavelength | Polarization |
| --- | --- | --- |
| Control plane | L0 | Horizontal |
| Data plane 1 | L1 | Vertical |
| Data plane 2 | L2 | Vertical |
| Data plane 3 | L3 | Vertical |
| Data plane 4 | L4 | Vertical |
| Data plane 5 | L5 | Vertical |
| Data plane 6 | L6 | Vertical |
| Data plane 7 | L7 | Vertical |

Control Extraction

The control plane is then extracted from the fiber by means of a polarization separator, which routes the data channel to one switch array and the control channel to another.

Rotation Switching

The dual switches are designed to route from each input port to each output port in turn, on receipt of a control signal. The two switches are synchronised together, but with the control switch operating a number of ports in advance of the data switch. The two switches are built appropriately for the polarization of the channels they have to carry.

Re-Mixing

After rotation switching, the control and data channels are merged together again, and enter the fiber leading to the next stage of the switch.

OTHER CONSIDERATIONS.

Guard bands

When the main (rotator) switch cycles from one configuration to the next, there may be a short period in which it is not safe to pass data through. In order to avoid this, guard bands may be introduced. This is accomplished by running the fiber links at a slightly higher rate than in the electronic version, introducing guard bands at the changeover times, and buffering the data to smooth it out again on the far side.

Very large systems

Because there is negligible delay incurred by passing through the DMR, it is possible to chain multiple DMRs together to form very large switches with huge numbers of ports. This is another case whereby a programmable offset between the control and data planes is very useful.

Fault tolerance

Because of the photonic nature of this invention, it is mostly likely to suffer total failure as a result of a fault, rather than a less detectable type of fault. It is not possible for a bit-stuck type problem to occur in this design, so data corruption by bit errors is less likely than with an electronic solution.

Bi-directionality

The majority of the photonic components described operate in a bi-directional manner. This is particularly true of the Dual Switching method of providing control channel offset. Therefore, it should be possible to use this same photonic rotator unit for the return half of the Turbine switch architecture as well as the outward.

This may require some more sophistication in order to bring the control plane information back in an appropriate offset manner, but this should still be possible.

Using the device in this manner will have an adverse effect on the signal-to-noise ratio (due to echo effects), but since the fiber lengths involved are short (inter-rack distances}there should be sufficient budget to allow for this.

Variable Configuration

The device is normally configured as a single 16×16 rotator. However, by changing the switching algorithm used in the on-chip logic for the space switches, it is equally easy to produce for example two 8×8 rotators, or four 4×4 ones from the same rotator. This can be selected by means of software control, and provides for good flexibility in an environment where dynamic system growth is a major consideration.

CLOCK DISTRIBUTION

Figure 6:
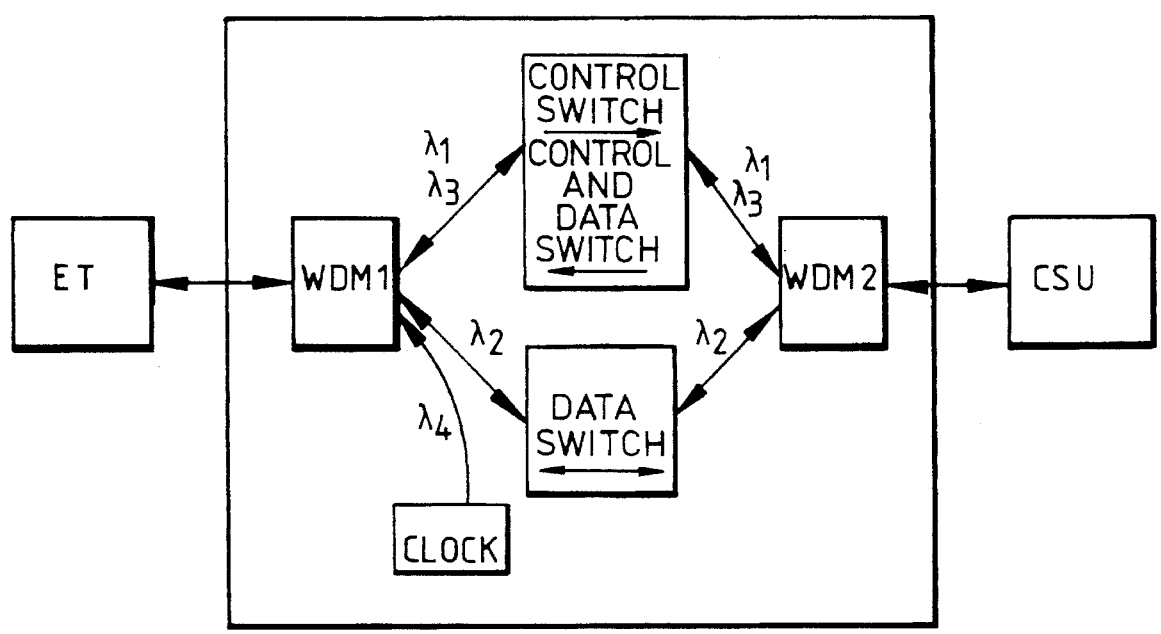
FIG. 6 shows a block diagram of a clock distribution arrangement.

As shown in FIG. 6 distribution of the clock signal can be simplified by supplying the clock signal to the Rotator card(s). Each card will have one or more Rotators and an input WDM1 and an output WDM2. The optical frequencies are then as indicated on FIG. 6, $\lambda_1$ being the control signal frequency, $\lambda_2$ being the data signal frequency, $\lambda_3$ being the frequency for combined data and control signals and $\lambda_4$ the clock signal frequency. The clock signal frequency is then distributed to the Exchange Termination (ET) through WDM1.

We claim:

1. An optical telecommunications switching device for switching an optical signal from any one of a plurality of input ports to any one of a plurality of output ports within a rotation cycle, the optical signal having at least one control channel having a specific polarization and a plurality of data channels each having a polarization opposite to that of the polarization of said at least one control channel, the switching device comprising: photonic channel separation means for separating said at least one control channel from the data channels by their respective polarizations, and being connected to one or more of said input ports for connecting said separated one control channel thereto, and for connecting the data channels to others of said input ports after the connection of said separated one control channel; a plurality of central switching units; each of the input ports being connectable, in turn, by a respective space switching means to one of said central switching units, and subsequently connecting each central switching unit to each of said plurality of output ports, in turn, by switching the optical signal to a respective said output port by way of a further respective space switching means.

2. The switching device as claimed in claim 1, wherein each data channel within the optical signal is encoded on a separate optical wavelength.

3. The switching device as claimed in claim 2, wherein the space switching means is a photonic space switch.

4. The switching device as claimed in claim 3, wherein the photonic channel separation means includes means for demultiplexing said at least one control channel from the optical signal prior to the space switch, and means for inserting said at least one control channel in an earlier port of the space switch.

* * * * *